US012617206B2

(12) United States Patent
Nie et al.

(10) Patent No.: US 12,617,206 B2
(45) Date of Patent: May 5, 2026

(54) MAINTENANCE DEVICE AND INKJET RECORDING APPARATUS

(71) Applicant: KYOCERA Document Solutions Inc., Osaka (JP)

(72) Inventors: Yiquan Nie, Osaka (JP); Takashi Somete, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 139 days.

(21) Appl. No.: 18/812,280

(22) Filed: Aug. 22, 2024

(65) Prior Publication Data

US 2025/0065630 A1 Feb. 27, 2025

(30) Foreign Application Priority Data

Aug. 23, 2023 (JP) ................................ 2023-135250

(51) Int. Cl.
*B41J 2/165* (2006.01)

(52) U.S. Cl.
CPC ....... *B41J 2/16508* (2013.01); *B41J 2/16505* (2013.01); *B41J 2/16552* (2013.01); *B41J 2/16585* (2013.01); *B41J 2/165* (2013.01); *B41J 2/16523* (2013.01); *B41J 2/16532* (2013.01); *B41J 2/16535* (2013.01); *B41J 2002/16555* (2013.01); *B41J 2002/16558* (2013.01); *B41J 2002/16594* (2013.01)

(58) Field of Classification Search
CPC ............... B41J 2/16508; B41J 2/16505; B41J 2/16552; B41J 2/16585; B41J 2/165; B41J 2/16523; B41J 2/16532; B41J 2/16535; B41J 2002/16555; B41J 2002/16558; B41J 2002/16594
See application file for complete search history.

(56) References Cited

U.S. PATENT DOCUMENTS

| | | | | |
|---|---|---|---|---|
| 8,807,701 | B2 * | 8/2014 | Shinoda | B41J 2/16508 347/29 |
| 10,717,283 | B2 * | 7/2020 | Shimizu | B41J 2/165 |
| 2012/0154474 | A1 | 6/2012 | Hazeyama | |
| 2012/0162311 | A1 * | 6/2012 | Taira | B41J 2/165 347/30 |
| 2012/0194604 | A1 * | 8/2012 | Tamaki | B41J 2/165 347/22 |
| 2022/0314612 | A1 * | 10/2022 | Ueno | B41J 2/16508 |

FOREIGN PATENT DOCUMENTS

| | | |
|---|---|---|
| JP | 2012131064 A | 7/2012 |

* cited by examiner

*Primary Examiner* — Henok D Legesse
(74) *Attorney, Agent, or Firm* — Alleman Hall LLP

(57) ABSTRACT

A maintenance device includes: a cap to be attached to a nozzle surface of an inkjet head; an air supply opening and an exhaust opening provided in the cap; and a suppression member which is provided at least between the air supply opening and the nozzle surface and has a first gap with respect to the air supply opening and a second gap with respect to the nozzle surface, and an end portion of the suppression member on a side of the exhaust opening opposes the exhaust opening.

5 Claims, 19 Drawing Sheets

IV - IV

V - V

MAINTENANCE DEVICE AND INKJET RECORDING APPARATUS

INCORPORATION BY REFERENCE

This application is based upon and claims the benefit of priority from the corresponding Japanese Patent Application No. 2023-135250 filed on Aug. 23, 2023, the entire contents of which are incorporated herein by reference.

BACKGROUND

The present disclosure relates to a maintenance device which performs maintenance of an inkjet head, and an inkjet recording apparatus.

In an inkjet recording apparatus that uses aqueous ink, there is a fear that, while printing is not executed, moisture will evaporate from the ink in nozzles and viscosity will increase, to thus cause an ejection failure or clogging. In this regard, there has conventionally been discussed a technique of suppressing evaporation of moisture from the ink in the nozzles. As the related art, an apparatus which supplies humidified air into a cap that covers an ejection surface (a nozzle surface) of a head is being discussed.

SUMMARY

To solve the problem described above, a maintenance device according to the present disclosure includes: a cap to be attached to a nozzle surface of an inkjet head; an air supply opening and an exhaust opening provided in the cap; and a suppression member which is provided at least between the air supply opening and the nozzle surface and has a first gap with respect to the air supply opening and a second gap with respect to the nozzle surface, and an end portion of the suppression member on a side of the exhaust opening opposes the exhaust opening.

The suppression member may be provided along a direction that is directed from a side of the air supply opening toward the side of the exhaust opening.

The suppression member may include, at positions not opposing the air supply opening, a plurality of through-holes which penetrate from a side of the air supply opening to a side of the nozzle surface.

The suppression member may be formed of a resin.

An inkjet recording apparatus according to the present disclosure includes the inkjet head and the maintenance device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

First Embodiment

Hereinafter, an inkjet recording apparatus 1 according to a first embodiment of the present disclosure will be described with reference to the drawings.

Figure 1:
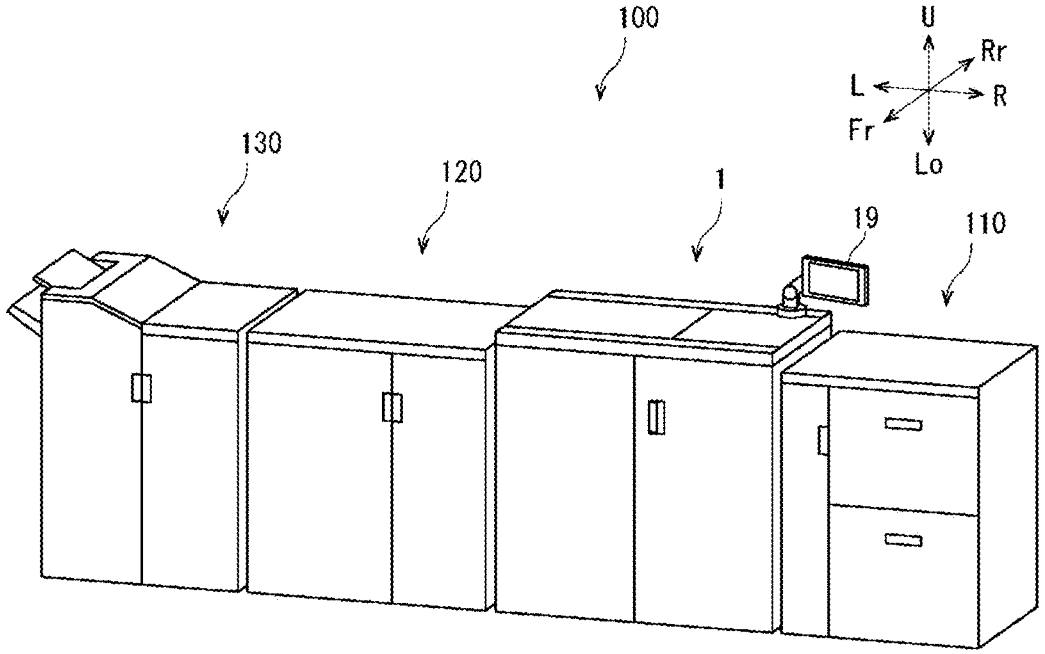
FIG. 1 is a perspective view showing an outer appearance of an image forming system according to a first embodiment of the present disclosure.
Figure 2:
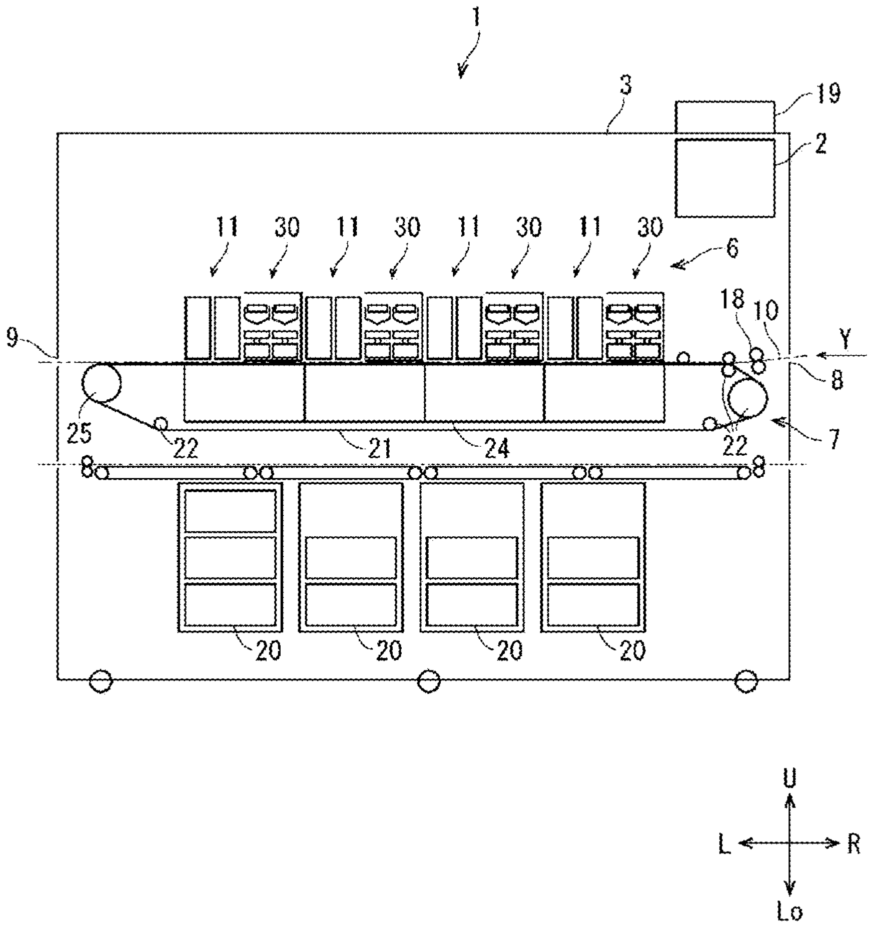
FIG. 2 is a front view schematically showing an internal configuration of an inkjet recording apparatus according to the first embodiment of the present disclosure.
Figure 3:
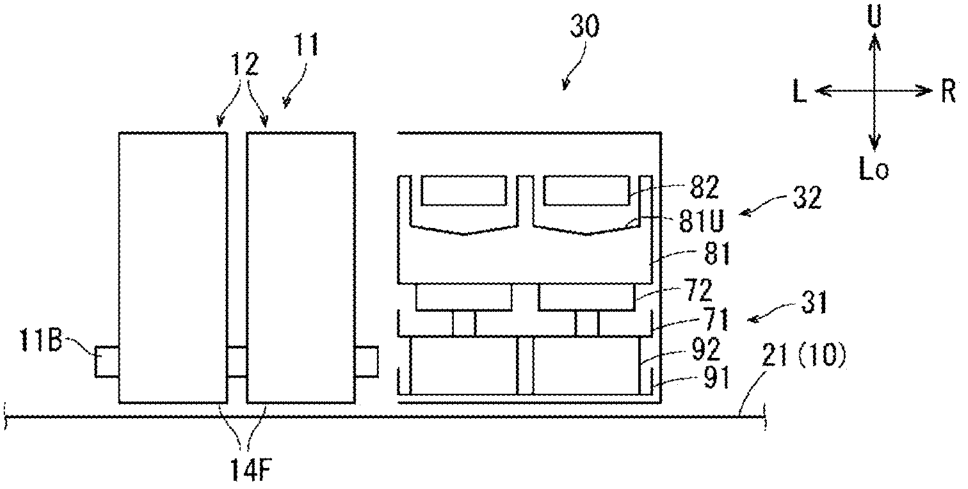
FIG. 3 is a front view schematically showing a head unit and a maintenance device according to the first embodiment of the present disclosure.
Figure 4:
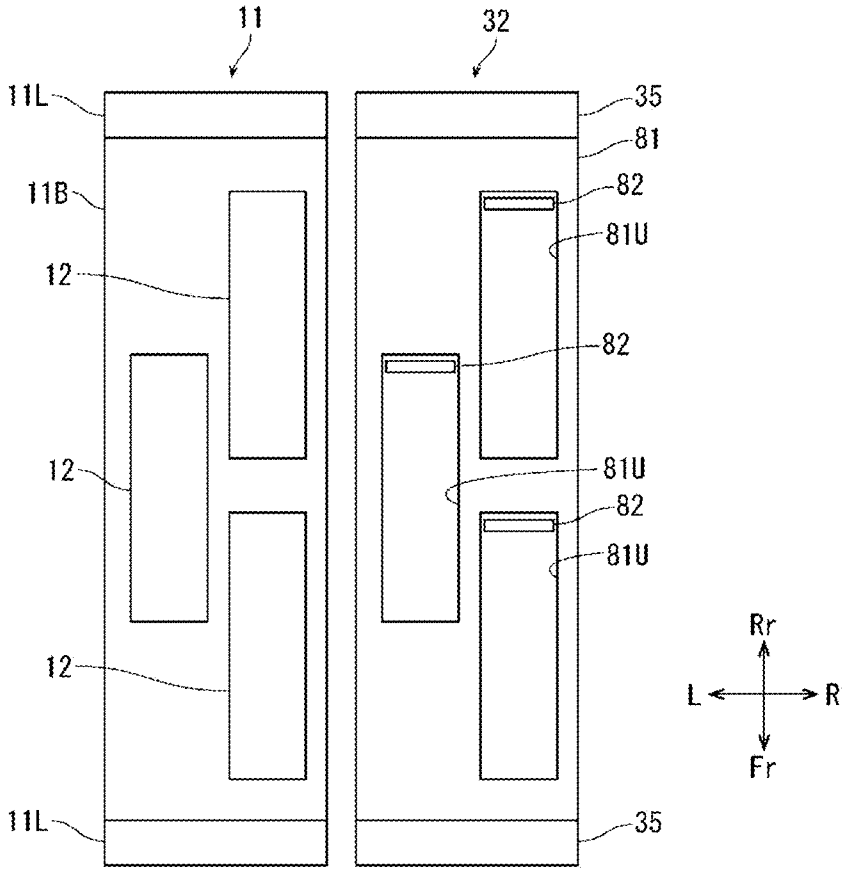
FIG. 4 is a plan view schematically showing the head unit and a wipe unit according to the first embodiment of the present disclosure.
Figure 5:
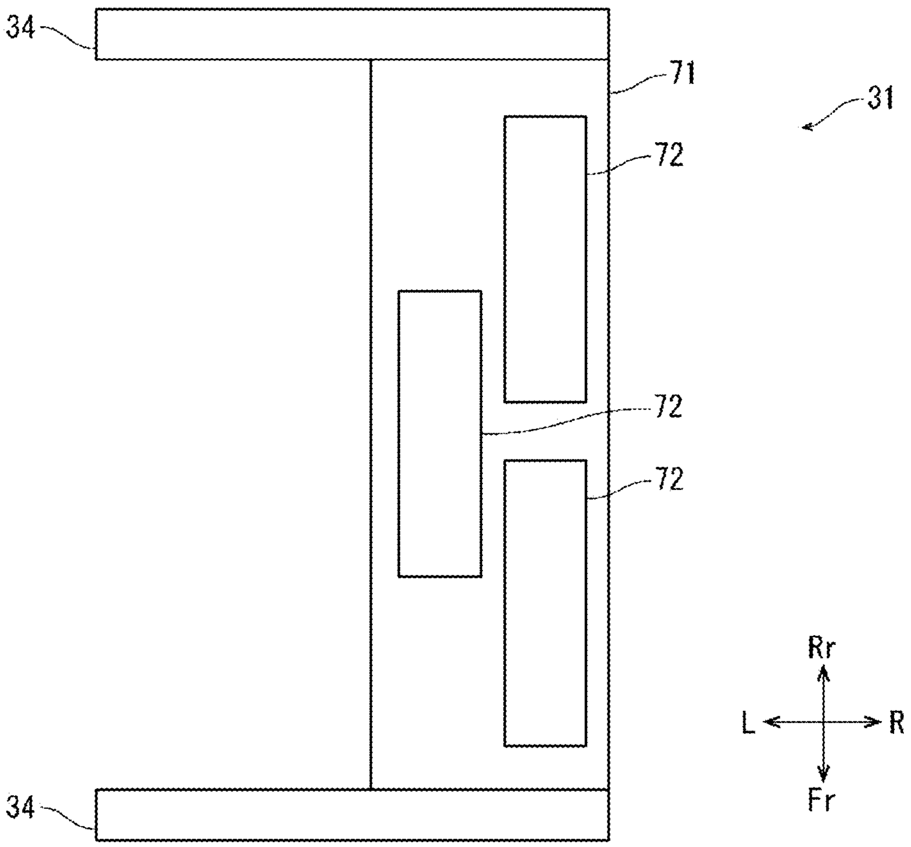
FIG. 5 is a plan view schematically showing a cap unit according to the first embodiment of the present disclosure.
Figure 6:
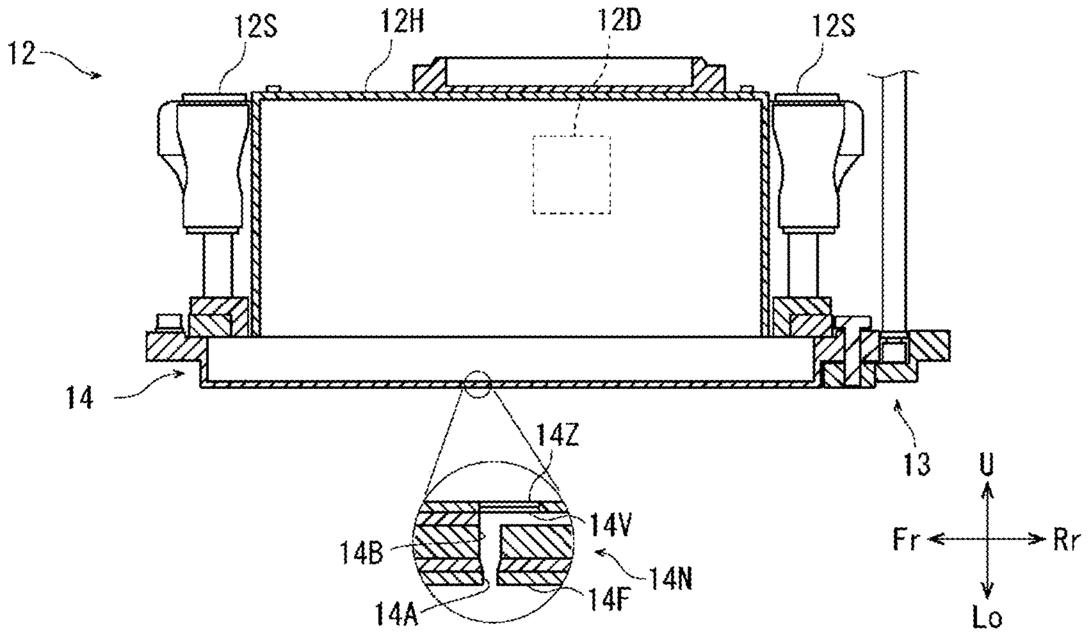
FIG. 6 is a cross-sectional view showing an inkjet head according to the first embodiment of the present disclosure.
Figure 7:
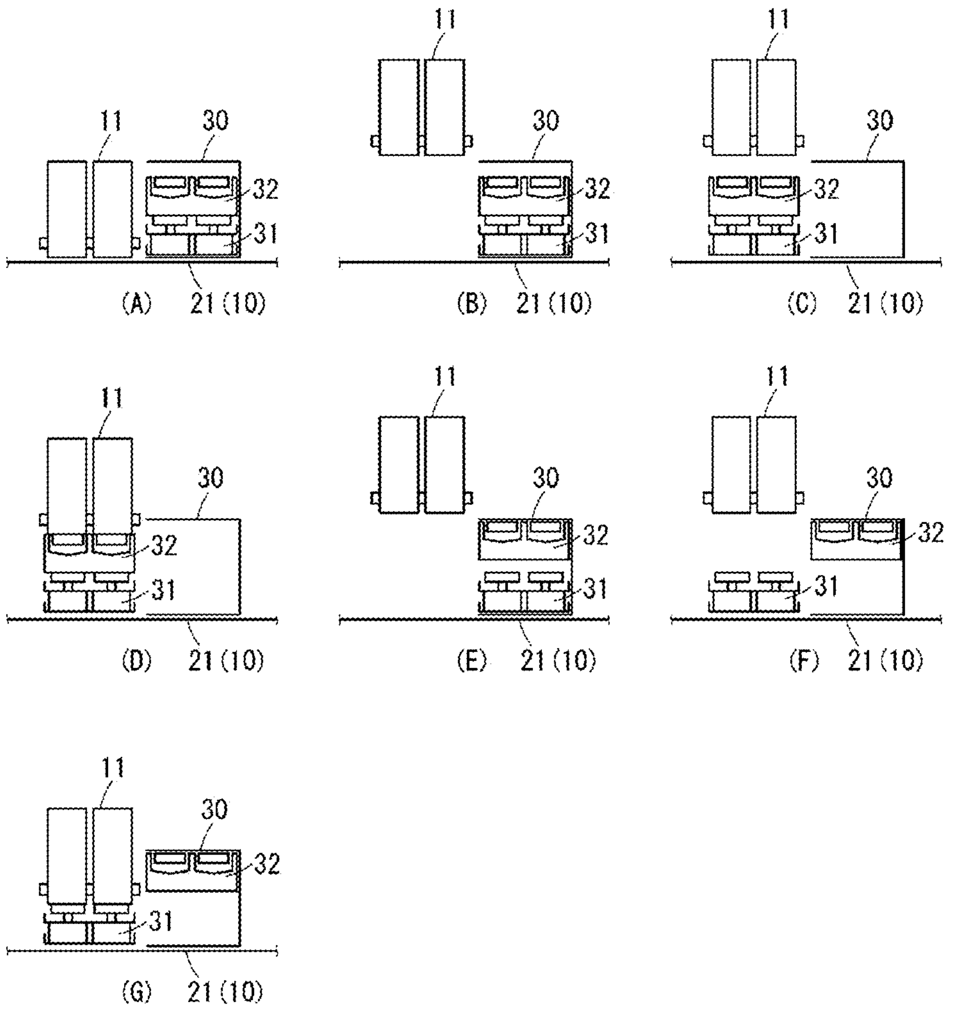
FIG. 7 are front views showing operations of the maintenance device according to the first embodiment of the present disclosure.

FIG. 1 is a perspective view showing an outer appearance of an image forming system 100. FIG. 2 is a front view schematically showing an internal configuration of the inkjet recording apparatus 1. FIG. 3 is a front view schematically showing a head unit 11 and a maintenance device 30. FIG. 4 is a plan view schematically showing the head unit 11 and a wipe unit 32. FIG. 5 is a plan view schematically showing a cap unit 31. FIG. 6 is a cross-sectional view showing an inkjet head 12. FIG. 7 are front views showing operations of the maintenance device 30. Hereinafter, descriptions will be given while a near side of a sheet surface shown in FIG. 2 is set as a front surface (front side) of the inkjet recording apparatus 1 and a left-right direction is defined using a direction in which the inkjet recording apparatus 1 is seen from the front as a reference. In the respective figures, U, Lo, L, R, Fr, and Rr respectively indicate upper, lower, left, right, front, and rear.

The image forming system 100 (see FIG. 1) includes a sheet feed apparatus 110, the inkjet recording apparatus 1, a drying apparatus 120, and a post-processing apparatus 130. The sheet feed apparatus 110 stores several thousand sheets and supplies the sheets to the inkjet recording apparatus 1. The inkjet recording apparatus 1 forms an image on the sheet using an inkjet system. The drying apparatus 120 heats the sheet conveyed from the inkjet recording apparatus 1 and dries ink. The post-processing apparatus 130 carries out post-processing such as punching, stapling, and folding on the sheet conveyed from the drying apparatus 120.

The inkjet recording apparatus 1 (see FIG. 2) includes a body housing 3 having a rectangular parallelepiped shape. At a center portion inside the body housing 3, a conveying unit 7 which causes the sheet to stick and conveys the sheet in a Y direction is provided. An imaging unit 6 which ejects ink to form an image is provided above the conveying unit 7. On a right side surface of the body housing 3, a sheet feed opening 8 through which the sheet enters from the sheet feed apparatus 110 is provided. On a left side surface of the body housing 3, a discharge opening 9 through which the sheet on which an image has been formed is discharged to the drying apparatus 120 is provided. Inside the body housing 3, a conveying path 10 that is provided from the sheet feed opening 8 to the discharge opening 9 via a gap between the conveying unit 7 and the imaging unit 6 is provided. A registration roller 18 is provided more on an upstream side of the conveying direction Y than the conveying unit 7.

The conveying unit 7 includes an endless conveying belt 21 and a suction portion 24. The conveying belt 21 includes a large number of air holes (not shown) and is wound around a drive roller 25 and a driven roller 22. An upper surface of the suction portion 24 includes a large number of air holes (not shown) and is in contact with an inner surface of the conveying belt 21. The suction portion 24 sucks in air via the air holes of the conveying belt 21 and the air holes of the suction portion 24 to thus cause the sheet to stick to the conveying belt 21. The drive roller 25 is driven in a counterclockwise direction by a drive portion (not shown) including a motor and a reduction gear so that the conveying belt 21 rotates in the counterclockwise direction and the sheet stuck to the conveying belt 21 is conveyed in the Y direction.

The imaging unit 6 includes a plurality of (four in the present embodiment) head units 11. The head unit 11 (see FIG. 3 and FIG. 4) includes one or more (three in the present embodiment) inkjet heads 12. To the head units 11, ink containers 20 respectively filled with ink of black, cyan, magenta, and yellow are connected, respectively.

The inkjet head 12 (see FIG. 6) includes a casing 12H of a rectangular parallelepiped shape, that has a front-rear direction as a longitudinal direction, a nozzle plate 14 provided at a bottom portion of the casing 12H, and a socket 12S to which a pipe for supplying ink is connected. The nozzle plate 14 includes a large number of nozzles 14N arranged in the front-rear direction. The nozzles 14N each include a branched flow path 14B that is branched from a downstream side of the socket 12S and an ejection port 14A provided on a nozzle surface 14F that is a lower surface of the nozzle plate 14. A vibration plate 14V doubles as a part of an inner wall of the branched flow path 14B. The vibration plate 14V is provided with a pressurization element 14Z. A piezoelectric device, a static actuator, a heater, or the like is used as the pressurization element 14Z. A drive circuit 12D which drives the pressurization element 14Z is connected to the pressurization element 14Z.

A control portion 2 (see FIG. 2) includes an arithmetic portion and a storage portion (not shown). The arithmetic portion is, for example, a CPU (Central Processing Unit). The storage portion includes storage media such as a ROM (Read Only Memory), a RAM (Random Access Memory), and an EEPROM (Electrically Erasable Programmable Read Only Memory). The arithmetic portion reads control programs stored in the storage portion and executes the control programs to perform various types of processing. It is noted that the control portion 2 may be realized by an integrated circuit that does not use software.

A display operation portion 19 is provided at an upper portion of the body housing 3 (see FIG. 1 and FIG. 2). The display operation portion 19 includes a display panel, a touch panel stacked on the display panel, and a keypad (not shown). The control portion 2 causes the display panel to display a screen that shows an operation menu, a status, or the like of the inkjet recording apparatus 1, and controls the respective portions of the inkjet recording apparatus 1 according to operations detected by the touch panel or the keypad.

Basic image forming operations of the inkjet recording apparatus 1 are as follows. When an image forming job is input to the inkjet recording apparatus 1 from the display operation portion 19, an external computer, or the like, the sheet feed apparatus 110 feeds the sheet to the conveying path 10 via the sheet feed opening 8, and the registration roller 18 whose rotation has been stopped corrects a skew of the sheet. As the registration roller 18 feeds the sheet to the conveying unit 7 at a predetermined timing, the conveying unit 7 causes the sheet to stick to the conveying belt 21 to convey the sheet in the Y direction. Ink is ejected onto the sheet from the inkjet heads 12, and thus images are formed. The sheet on which the images have been formed is discharged to the drying apparatus 120 via the discharge opening 9.

[Maintenance Device]

Next, the maintenance device 30 will be described. It is noted that the four head units 11 have the same configuration, and the four maintenance devices 30 have the same configuration, so descriptions below will be given on one head unit 11 and one maintenance device 30 provided on a right side of that head unit 11.

The head unit 11 includes a head base 11B (see FIG. 3 and FIG. 4) which supports the inkjet heads 12. In the head base 11B, three inkjet heads 12 are provided in a staggered pattern.

The maintenance device 30 (see FIG. 3) is provided next to the head unit 11 (the right side in the present embodiment). The maintenance device 30 includes a cap unit 31 and a wipe unit 32.

[Cap Unit]

The cap unit 31 (see FIG. 3 and FIG. 5) includes caps 72 in the same number as the inkjet heads 12 (three in the present embodiment) provided in the head unit 11. The three caps 72 are arranged in a staggered pattern similar to the inkjet heads 12 and are supported by a frame body 71. The two caps 72 are arranged on front and rear sides at positions more on the right side than a center of a left-right direction of the frame body 71, and one cap 72 is arranged on the left side. The one left-side cap 72 is arranged at an intermediate position between the two right-side caps 72 in the front-rear direction.

[Wipe Unit]

The wipe unit 32 (see FIG. 3 and FIG. 4) includes a waste tray 81 and cleaning members 82. The waste tray 81 includes concave portions 81U in the same number as the inkjet heads 12 provided in the head unit 11. The plurality of concave portions 81U are arranged in a staggered pattern similar to the inkjet heads 12. The cleaning members 82 are respectively provided in the concave portions 81U. The cleaning member 82 is, for example, a blade. The waste tray 81 includes a drive portion (not shown) which causes the cleaning members 82 to slide along the nozzle surface 14F. The waste tray 81 is placed on the plurality of caps 72. In other words, the wipe unit 32 is placed on the cap unit 31. The head unit 11 is provided with a cleaning fluid supply device 13 (see FIG. 6) which supplies a cleaning fluid to the nozzle surface 14F.

[Head Lifting and Lowering Device]

Head lifting and lowering devices 11L (see FIG. 4) are provided on front and rear sides of the head base 11B. The head lifting and lowering device 11L is configured by, for example, a ball screw, a belt drive device, or the like. The head lifting and lowering device 11L lifts and lowers the head unit 11 between an image forming position and an evacuation position. The image forming position (see FIG. 7(A)) is a position at which an interval between the conveying path 10 on which the sheet is conveyed (the upper surface of the conveying belt 21) and the nozzle surface 14F becomes a predetermined distance suited for image formation. The image forming position is a lower limit position of a lifting and lowering range of the head unit 11 by the head lifting and lowering device 11L. The evacuation position (see FIG. 7(B)) is a position at which the head unit 11 does not interfere with the wipe unit 32 when the cap unit 31 and the wipe unit 32 are caused to slide using a cap slide device 34 to be described later. The evacuation position is an upper limit position of the lifting and lowering range of the head unit 11.

[Cap Slide Device]

The cap slide devices 34 (see FIG. 5) are provided on front and rear sides of the frame body 71 of the cap unit 31. The cap slide device 34 is configured by, for example, a ball screw, a belt drive device, or the like. The cap slide device 34 causes the cap unit 31 to slide between a home position and a maintenance position. The home position (see FIG. 7(A)) is a position on the right side of the head unit 11 positioned at the image forming position. The maintenance position (see FIG. 7(F)) is a position below the head unit 11 positioned at the evacuation position.

[Wipe Lifting and Lowering Device]

Wipe lifting and lowering devices 35 (see FIG. 4) are provided on front and rear sides of the waste tray 81 of the wipe unit 32. The wipe lifting and lowering device 35 is configured by, for example, a ball screw, a belt drive device, or the like. The wipe lifting and lowering device 35 lifts and lowers the wipe unit 32 between a contact position (see FIG. 7(B)) at which the waste tray 81 comes into contact with the caps 72 and a spaced position (see FIG. 7(E)) at which the waste tray 81 is spaced apart from the caps 72 by a predetermined distance.

Figure 8:
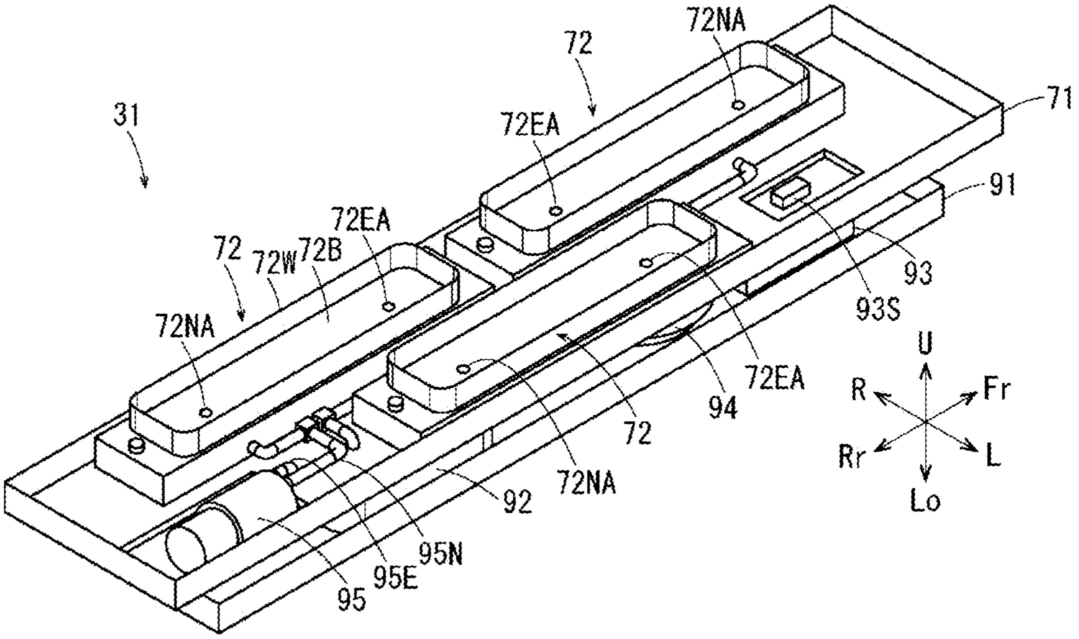
FIG. 8 is a perspective view showing the cap unit according to the first embodiment of the present disclosure.
Figure 9:
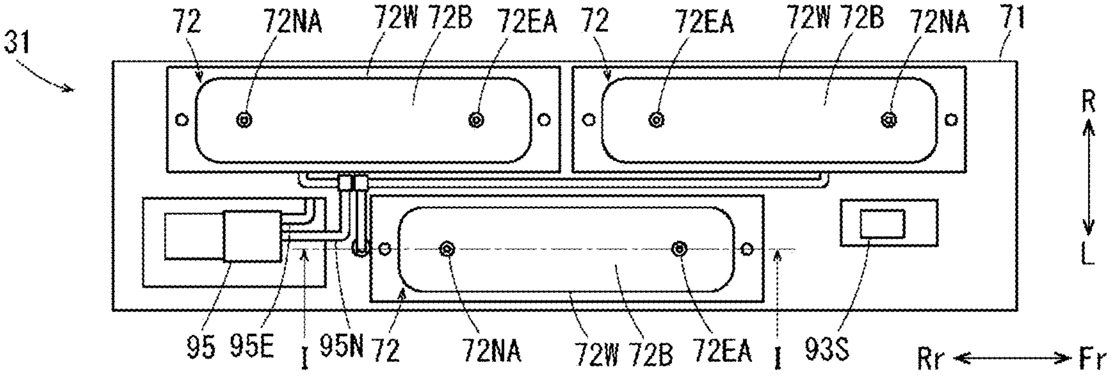
FIG. 9 is a plan view showing the cap unit according to the first embodiment of the present disclosure.
Figure 10:
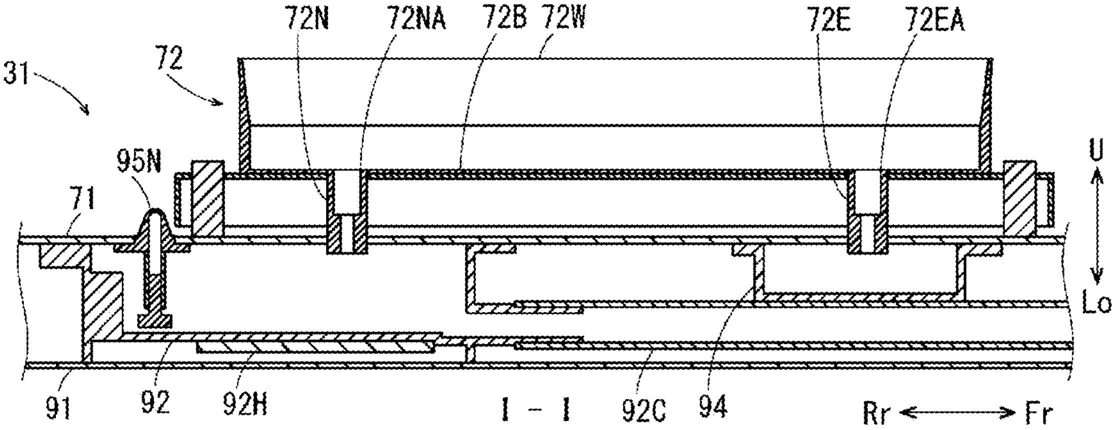
FIG. 10 is a cross-sectional view showing an I-I cross section of FIG. 9.
Figure 11:
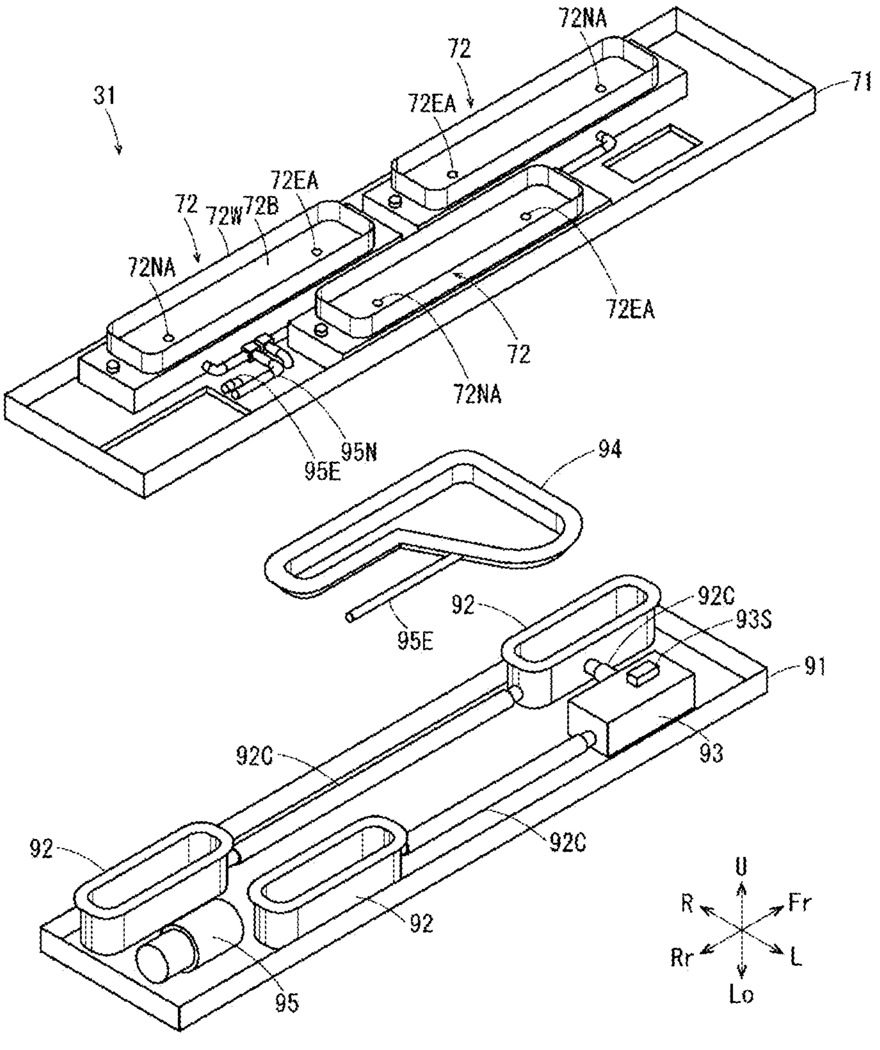
FIG. 11 is an exploded view showing the cap unit according to the first embodiment of the present disclosure.
Figure 12:
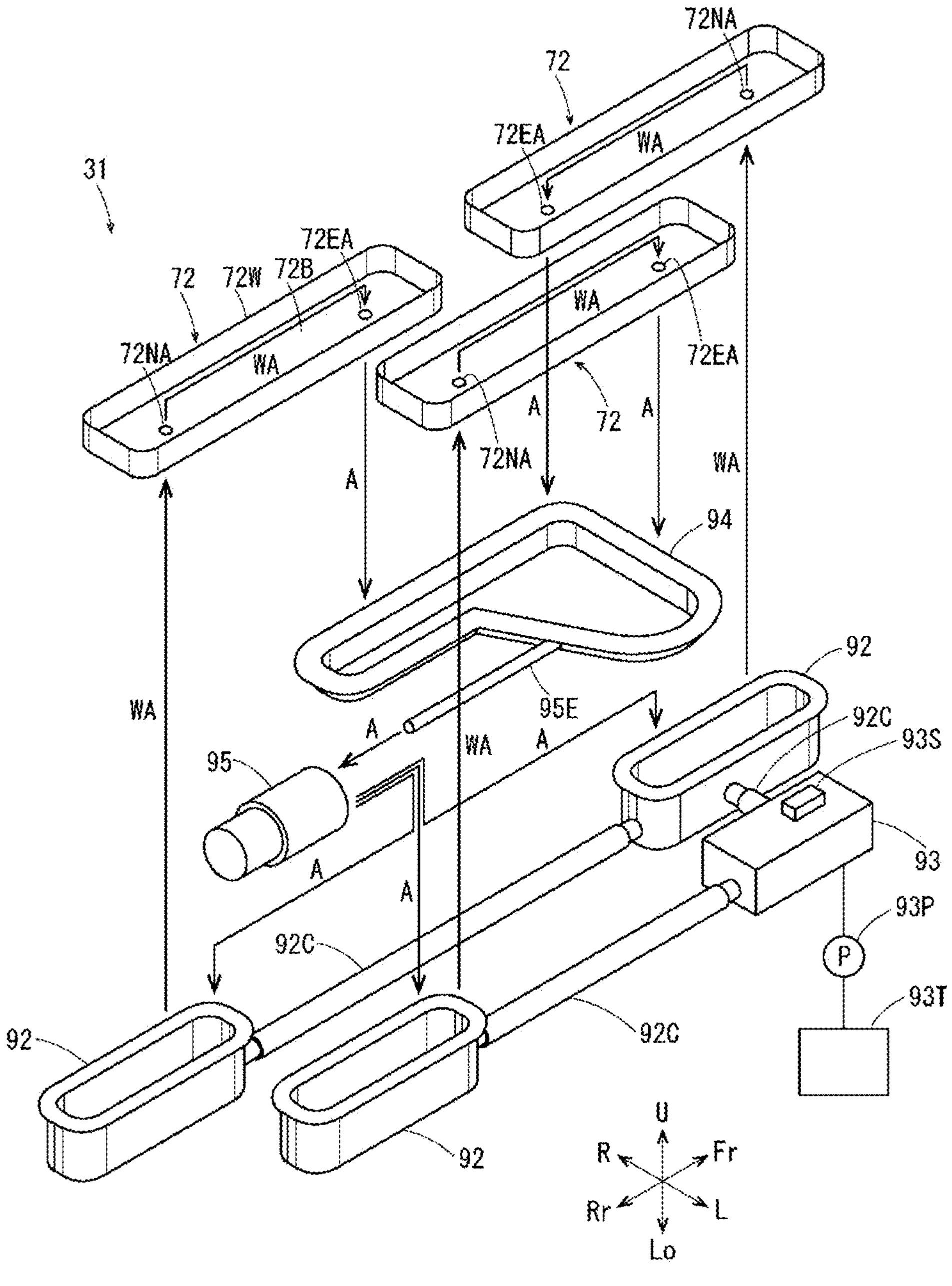
FIG. 12 is a diagram showing flows of air and humidified air in the cap unit according to the first embodiment of the present disclosure.
Figure 13:
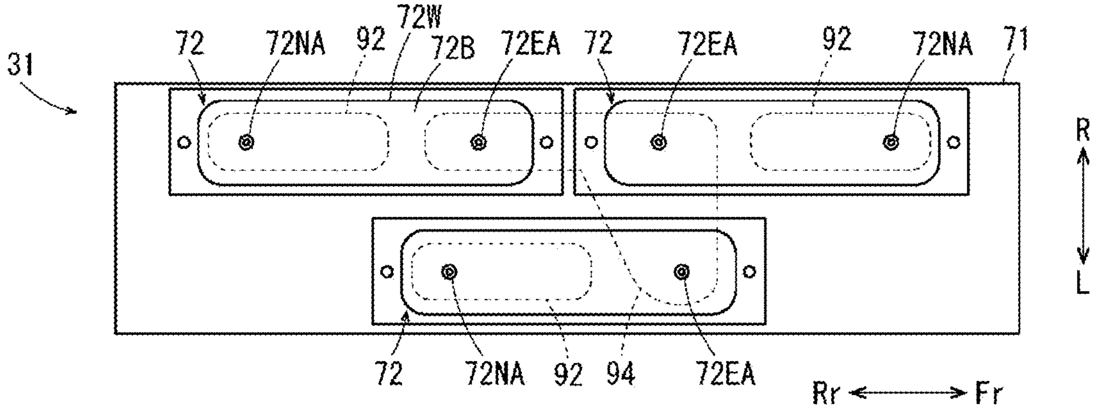
FIG. 13 is a plan view showing positions of humidifying tanks and a recovery tank according to the first embodiment of the present disclosure.
Figure 14:
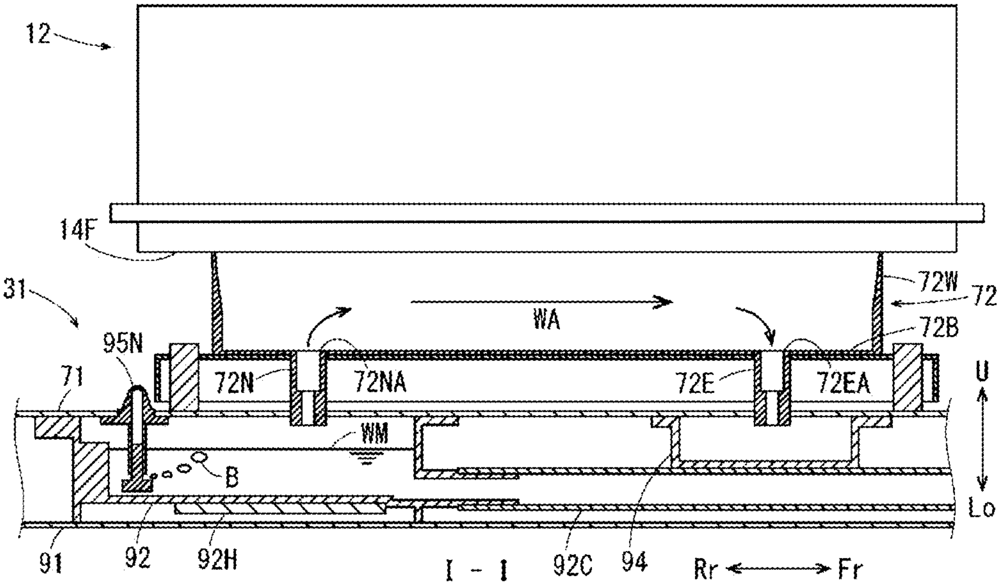
FIG. 14 is a cross-sectional view showing a flow of humidified air in the cap according to the first embodiment of the present disclosure.

Next, a configuration of the cap unit 31 will be described in detail. FIG. 8 is a perspective view showing the cap unit 31. FIG. 9 is a plan view showing the cap unit 31. FIG. 10 is a cross-sectional view showing an I-I cross section of FIG. 9. FIG. 11 is an exploded view showing the cap unit 31. FIG. 12 is a diagram showing flows of air A and humidified air WA in the cap unit 31. FIG. 13 is a plan view showing positions of humidifying tanks 92 and a recovery tank 94. FIG. 14 is a cross-sectional view showing a flow of humidified air WA in the cap 72.

[Cap]

The caps 72 (see FIG. 8 to FIG. 10) are each formed in a box shape that is opened upwardly. The cap 72 includes a bottom portion 72B substantially in a rectangular shape, that has the front-rear direction as a longitudinal direction, and a side wall portion 72W erected upwardly from an edge of the bottom portion 72B. The side wall portion 72W is formed of a material having flexibility, such as rubber. The bottom portion 72B is provided with an air supply opening 72NA and an exhaust opening 72EA. In the right rear cap 72 and the left-side cap 72, the air supply opening 72NA is provided on the rear side, and the exhaust opening 72EA is provided on the front side. In the right front cap 72, the air supply opening 72NA is provided on the front side, and the exhaust opening 72EA is provided on the rear side.

[Humidifying Tank, Recovery Tank]

Humidifying tanks 92 in the same number as the caps 72 (three in the present embodiment) and one recovery tank 94 are provided below the frame body 71 (see FIG. 8 and FIG. 11 to FIG. 13). The humidifying tanks 92 and the recovery tank 94 are supported by a frame body 91. The humidifying tanks 92 are respectively arranged below the air supply openings 72NA of the caps 72. The recovery tank 94 has a shape that encompasses all of the exhaust openings 72EA in a plan view and is arranged below all of the exhaust openings 72EA.

An air supply pipe 72N (see FIG. 10) that brings the cap 72 and the humidifying tank 92 below that cap 72 in communication with each other is connected to the air supply opening 72NA of each of the caps 72. An exhaust pipe 72E that brings the cap 72 and the recovery tank 94 in communication with each other is connected to the exhaust opening 72EA of each of the caps 72. In other words, three exhaust pipes 72E are in communication with the recovery tank 94.

An air pump 95 is connected to the recovery tank 94 by a recovery flow path 95E (see FIG. 8, FIG. 9, and FIG. 11) and is connected to all of the humidifying tanks 92 by a supply flow path 95N. The air pump 95 recovers air A from the recovery tank 94 via the recovery flow path 95E and supplies the recovered air A to all of the humidifying tanks 92 via the supply flow path 95N (see FIG. 12).

All of the humidifying tanks 92 are connected to a humidifying sub-tank 93 via communication pipes 92C (see FIG. 10, FIG. 11, and FIG. 12). A humidifying medium tank 93T and a humidifying medium pump 93P are connected to the humidifying sub-tank 93. A humidifying medium WM (see FIG. 14) is accumulated in the humidifying medium tank 93T. The humidifying medium WM is, for example, water. The humidifying medium pump 93P supplies the humidifying medium WM from the humidifying medium tank 93T to the humidifying sub-tank 93. The humidifying sub-tank 93 is provided with a fluid level sensor 93S (see FIG. 8, FIG. 9, and FIG. 11) which detects a height of a fluid level in the humidifying sub-tank 93. The humidifying tank 92 is provided with a heater 92H (see FIG. 10) which heats the humidifying medium WM.

Next, basic operations of the maintenance device 30 will be described. In an initial state (see FIG. 7(A)), the head unit 11 is positioned at the image forming position, and the cap unit 31 is positioned at the home position. The wipe unit 32 is placed on the cap unit 31. In other words, the waste tray 81 is in contact with the caps 72. The control portion 2 executes processing described below at a predetermined timing. The predetermined timing is, for example, a timing at which a rise in viscosity of the ink in the nozzles 14N is predicted to occur, and is specifically a case where a period during which the image forming job is not executed continues for a predetermined period of time, or the like.

First, the control portion 2 activates the head lifting and lowering devices 11L to lift the head unit 11 to the evacuation position (see FIG. 7(B)). Next, the control portion 2 activates the cap slide devices 34 to cause the cap unit 31 to slide to the maintenance position (see FIG. 7(C)). At this time, since the wipe unit 32 is placed on the cap unit 31, the wipe unit 32 also slides to the maintenance position together with the cap unit 31. Next, the control portion 2 activates the head lifting and lowering devices 11L to lower the head unit 11 to a height at which the nozzle surface 14F comes into contact with the cleaning members 82 (see FIG. 7(D)).

Next, after forcing the inkjet heads 12 to eject a predetermined amount of ink, the control portion 2 supplies the cleaning fluid to the nozzle surface 14F and causes the cleaning members 82 to slide along the nozzle surface 14F. Consequently, ink remaining on the nozzle surface 14F is diluted by the cleaning fluid, and waste fluid containing the ink and the cleaning fluid is scraped by the cleaning members 82 and drops to the waste tray 81.

Next, the control portion 2 activates the head lifting and lowering devices 11L to lift the head unit 11 to the evacuation position (see FIG. 7(C)). Next, the control portion 2 activates the cap slide devices 34 to cause the cap unit 31 and the wipe unit 32 to slide to the home position (see FIG. 7(B)).

Next, the control portion 2 activates the wipe lifting and lowering devices 35 to lift the wipe unit 32 to the spaced position (see FIG. 7(E)). Next, the control portion 2 activates the cap slide devices 34 to cause the cap unit 31 to slide to the maintenance position (see FIG. 7(F)). At this time, since the wipe unit 32 is separated from the cap unit 31, the wipe unit 32 remains at the home position, and only the cap unit 31 slides to the maintenance position.

Next, the control portion 2 activates the head lifting and lowering devices 11L to lower the head unit 11 to a height at which the nozzle surface 14F comes into contact with the caps 72 (see FIG. 7(G)). Thus, the caps 72 are attached to the nozzle surface 14F.

Next, the control portion 2 humidifies the inside of the caps 72. The control portion 2 monitors measurement values by the fluid level sensor 93S and maintains the height of the fluid level in the humidifying sub-tank 93 within a predetermined range. Specifically, when the measurement value of the fluid level falls below the predetermined range, the humidifying medium WM is replenished only by a predetermined amount from the humidifying medium tank 93T to the humidifying sub-tank 93 using the humidifying medium pump 93P. Since the humidifying sub-tank 93 is in communication with the humidifying tanks 92 by the communication pipes 92C, the height of the fluid level of the humidifying medium WM becomes uniform in the humidifying sub-tank 93 and all of the humidifying tanks 92.

The air pump 95 (see FIG. 12) recovers the air A from the recovery tank 94 via the recovery flow path 95E and supplies the recovered air A to all of the humidifying tanks 92 via the supply flow path 95N. An end portion of the supply flow path 95N on the humidifying tank 92 side is arranged to be lower than the fluid level of the humidifying medium WM (see FIG. 14). Therefore, inside the humidifying tank 92, the air A is blown into the humidifying medium WM to cause air bubbles B. Until the air bubbles B surface the fluid level, a water vapor pressure of the air bubbles B rises. In addition, since the humidifying medium WM inside the humidifying tank 92 is heated by the heater 92H, water vapor is likely to be generated. Therefore, the humidified air WA having an increased water vapor pressure fills a space higher than the fluid level in the humidifying tank 92, and the humidified air WA flows into the caps 72 via the air supply pipe 72N.

On the other hand, since the air A is sucked by the air pump 95 in the recovery tank 94, a negative pressure is generated. Therefore, inside the cap 72, an airflow of the humidified air WA that flows from the air supply opening 72NA toward the exhaust opening 72EA is generated. In addition, since the humidified air WA heated by the heater 92H is supplied to the cap 72, a convection flow is generated in the cap 72, and the humidified air WA having a high temperature is supplied to the nozzle surface 14F. Thus, the humidified air WA comes into contact with the ink in the nozzles 14N, and the rise in viscosity of the ink is suppressed.

When executing the image forming job, the control portion 2 activates the head lifting and lowering devices 11L to lift the head unit 11 to the evacuation position (see FIG. 7(F)), activates the cap slide devices 34 to cause the cap unit 31 to slide to the home position (see FIG. 7(E)), and activates the wipe lifting and lowering devices 35 to lower the wipe unit 32 to the contact position (see FIG. 7(B)). Then, the control portion 2 activates the head lifting and lowering devices 11L to lower the head unit 11 to the image forming position, and executes the image forming job.

Incidentally, since the humidified air WA that has flown into the caps 72 via the air supply pipe 72N rises toward the nozzle surface 14F, the humidified air WA comes into direct contact with the nozzle surface 14F. In such a case, there is a possibility that dew condensation will be generated on the nozzle surface 14F, and the ink will be drawn by the dew condensation to leak from the nozzles 14N. There is a fear that the dropped ink will be accumulated in the cap 72 to inhibit the flow of the humidified air WA or cause clogging of the air supply pipe 72N.

Figure 15:
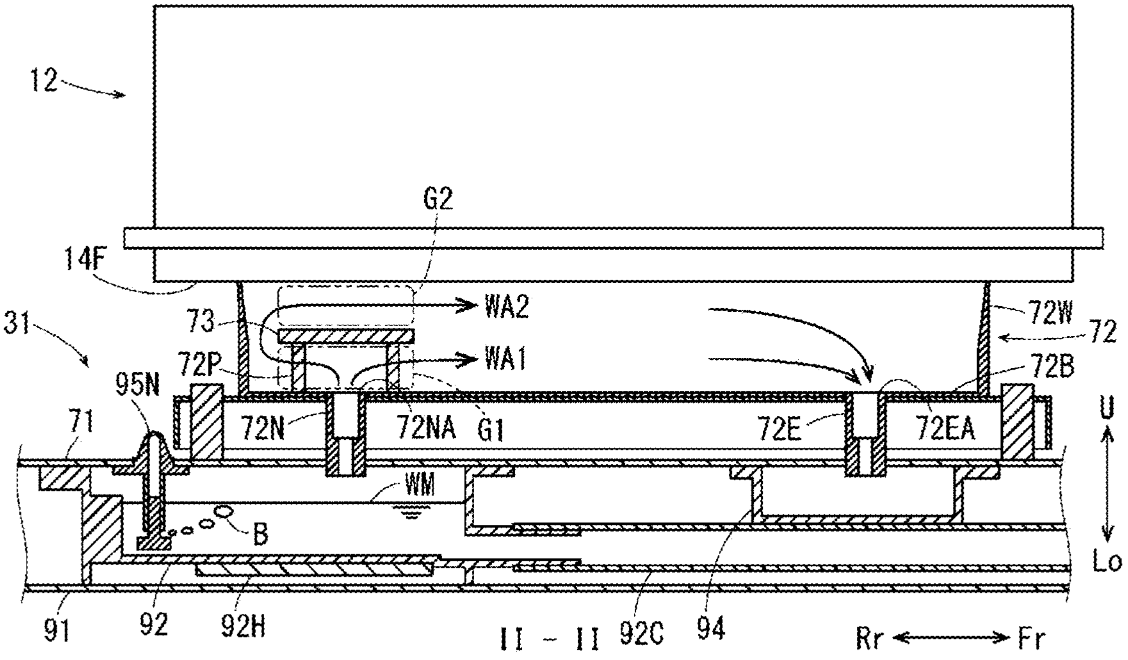
FIG. 15 is a cross-sectional view showing the cap unit including a suppression member according to the first embodiment of the present disclosure.
Figure 16:
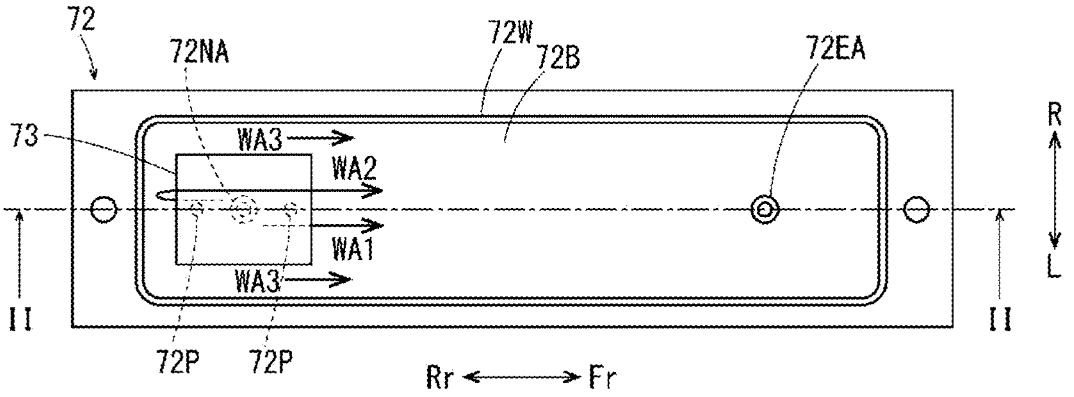
FIG. 16 is a plan view showing the cap including the suppression member according to the first embodiment of the present disclosure.

In this regard, the maintenance device 30 according to the present embodiment includes a suppression member 73. FIG. 15 is a cross-sectional view showing the cap unit 31 including the suppression member 73. FIG. 16 is a plan view showing the cap 72 including the suppression member 73. It is noted that FIG. 15 is a cross-sectional view showing an II-II cross section of FIG. 16.

The maintenance device 30 according to the present embodiment includes the cap 72 to be attached to the nozzle surface 14F of the inkjet head 12, the air supply opening 72NA provided in the cap 72, and the suppression member 73 which is provided at least between the air supply opening 72NA and the nozzle surface 14F and has a first gap G1 with respect to the air supply opening 72NA and a second gap G2 with respect to the nozzle surface 14F. Specifically, the configuration is as follows.

The suppression member 73 is provided above the air supply opening 72NA. The suppression member 73 is a plate-like member having an up-down direction as a thickness direction, and is formed of a resin. The suppression member 73 is supported by support columns 72P provided at the bottom portion 72B of the cap 72. The sizes of the suppression member 73 in the front-rear direction and the left-right direction are larger than that of the air supply opening 72NA. In a plan view, the suppression member 73 is provided to at least cover the entire air supply opening 72NA. The first gap G1 is provided between the air supply opening 72NA and a lower surface of the suppression member 73. The second gap G2 is provided between the nozzle surface 14F and an upper surface of the suppression member 73.

Partial humidified air WA1 (see FIG. 15) that has flown into the cap 72 from the air supply opening 72NA flows toward the front side from the first gap G1 and is sucked into the exhaust opening 72EA. Other partial humidified air WA2 flows into the second gap G2 from the first gap G1 via a rear side of the suppression member 73, flows toward the front side from the second gap G2, and is sucked into the exhaust opening 72EA. Other partial humidified air WA3 (see FIG. 16) flows toward the front side from left and right spaces of the suppression member 73 and is sucked into the exhaust opening 72EA. In other words, above the air supply opening 72NA, the humidified air WA flows along the lower surface and upper surface of the suppression member 73, so the humidified air WA does not come into direct contact with the nozzle surface 14F above the air supply opening 72NA. As a result, generation of dew condensation on the nozzle surface 14F is suppressed, and ink is prevented from being drawn by the dew condensation to leak from the nozzles 14N.

The reason why the suppression member 73 is formed of a resin is as follows. There is a fear that dew condensation will be generated on the suppression member 73 due to the suppression member 73 taking away heat from the humidified air WA. Particularly in the present embodiment, since the heater 92H is provided in the humidifying tank 92 for increasing an amount of water vapor of the humidified air WA, dew condensation is likely to be generated. When dew condensation is generated, the water vapor pressure of the humidified air WA decreases, and thus a humidifying effect with respect to the ink in the nozzles 14N is lowered. For suppressing dew condensation, it is desirable to form the suppression member 73 using a material having a low thermal conductivity. Since the resin generally has a lower thermal conductivity than metal, the resin is favorable as the material of the suppression member 73.

The maintenance device 30 according to the present embodiment described above includes the cap 72 to be attached to the nozzle surface 14F of the inkjet head 12, the air supply opening 72NA provided in the cap 72, and the suppression member 73 which is provided at least between the air supply opening 72NA and the nozzle surface 14F and has the first gap G1 with respect to the air supply opening 72NA and the second gap G2 with respect to the nozzle surface 14F. According to the present embodiment, it is possible to avoid a situation where the humidified air WA comes into direct contact with the nozzle surface 14F.

Moreover, according to the maintenance device 30 according to the present embodiment, the suppression member 73 is formed of a resin. According to the present embodiment, dew condensation of the humidified air WA can be suppressed.

Further, the inkjet recording apparatus according to the present embodiment includes the inkjet head 12 and the maintenance device 30. According to the present embodiment, a rise in viscosity of the ink in the nozzles 14N of the inkjet head 12 can be suppressed.

Second Embodiment

Figure 17:
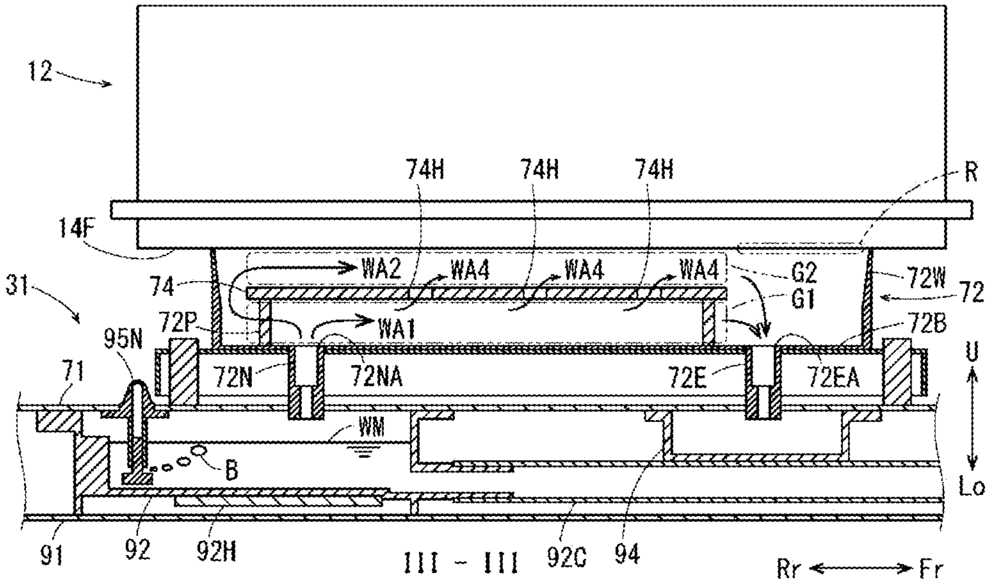
FIG. 17 is a cross-sectional view showing a cap unit including a suppression member according to a second embodiment of the present disclosure.
Figure 18:
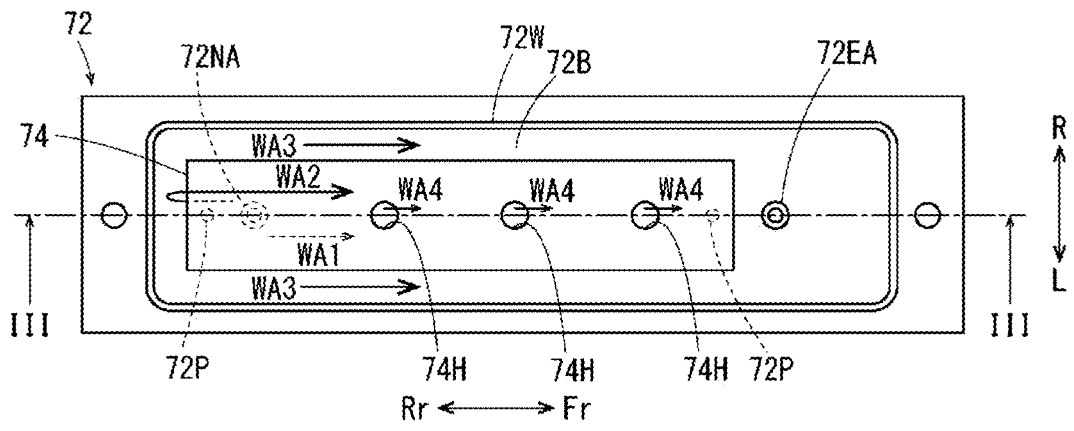
FIG. 18 is a plan view showing a cap including the suppression member according to the second embodiment of the present disclosure.

FIG. 17 is a cross-sectional view showing the cap unit 31 including a suppression member 74 according to a second embodiment. FIG. 18 is a plan view showing the cap 72 including the suppression member 74 according to the second embodiment.

The suppression member 74 is provided along a direction that is directed from the air supply opening 72NA side toward the exhaust opening 72EA side. Specifically, the suppression member 74 is a rectangular plate-like member having the direction that is directed from the air supply opening 72NA side toward the exhaust opening 72EA side as a longitudinal direction. The suppression member 74 is supported by the support columns 72P provided at the bottom portion 72B of the cap 72. A rear end portion of the suppression member 74 is arranged above the air supply opening 72NA. A front end portion of the suppression member 74 is positioned more on the rear side than the exhaust opening 72EA. The first gap G1 is provided between the air supply opening 72NA and a lower surface of the suppression member 74. The second gap G2 is provided between the nozzle surface 14F and an upper surface of the suppression member 74.

The suppression member 74 includes, at positions not opposing the air supply opening 72NA, through-holes 74H that penetrate from the air supply opening 72NA side toward the nozzle surface 14F side. The through-holes 74H are provided at a plurality of positions (three in the present embodiment) along the direction that is directed from the air supply opening 72NA side toward the exhaust opening 72EA side.

The partial humidified air WA1 (see FIG. 17) that has flown into the cap 72 from the air supply opening 72NA flows through the first gap G1 toward the front side and is sucked into the exhaust opening 72EA. The other partial humidified air WA2 flows into the second gap G2 from the first gap G1 via a rear side of the suppression member 74, flows through the second gap G2 toward the front side, and is sucked into the exhaust opening 72EA. The other partial humidified air WA3 (see FIG. 18) flows through left and right spaces of the suppression member 74 toward the front side and is sucked into the exhaust opening 72EA. In other words, since the humidified air WA flows across a wider range than in the embodiment above along the lower surface and upper surface of the suppression member 74, it is possible to avoid a situation where the humidified air WA comes into direct contact with the nozzle surface 14F across a wider range than in the embodiment above.

In addition, since partial humidified air WA4 that flows through the first gap G1 toward the exhaust opening 72EA flows from the first gap G1 to the second gap G2 via the through-holes 74H, a shortage of supply of the humidified air WA by the suppression member 74 can be compensated for. Moreover, since the humidified air WA is also supplied to the nozzle surface 14F spaced apart from the air supply opening 72NA via the through-holes 74H, uniformity of humidification with respect to the nozzle surface 14F is improved.

According to the maintenance device 30 according to the present embodiment described above, the cap 72 includes the exhaust opening 72EA, and the suppression member 74 is provided along the direction that is directed from the air supply opening 72NA side toward the exhaust opening 72EA side. According to the present embodiment, it is possible to avoid a situation where the humidified air WA comes into direct contact with the nozzle surface 14F across a wide range along the direction that is directed from the air supply opening 72NA side toward the exhaust opening 72EA side.

Further, according to the maintenance device 30 according to the present embodiment, the suppression member 74 includes, at positions not opposing the air supply opening 72NA, the through-holes 74H that penetrate from the air supply opening 72NA side to the nozzle surface 14F side. According to the present embodiment, a shortage of supply of the humidified air WA by the suppression member 74 can be compensated for.

Furthermore, according to the maintenance device 30 according to the present embodiment, the cap 72 includes the exhaust opening 72EA, and the through-holes 74H are respectively provided at the plurality of positions along the direction that is directed from the air supply opening 72NA side toward the exhaust opening 72EA side. According to the present embodiment, the uniformity of humidification with respect to the nozzle surface 14F can be improved.

Third Embodiment

Figure 19:
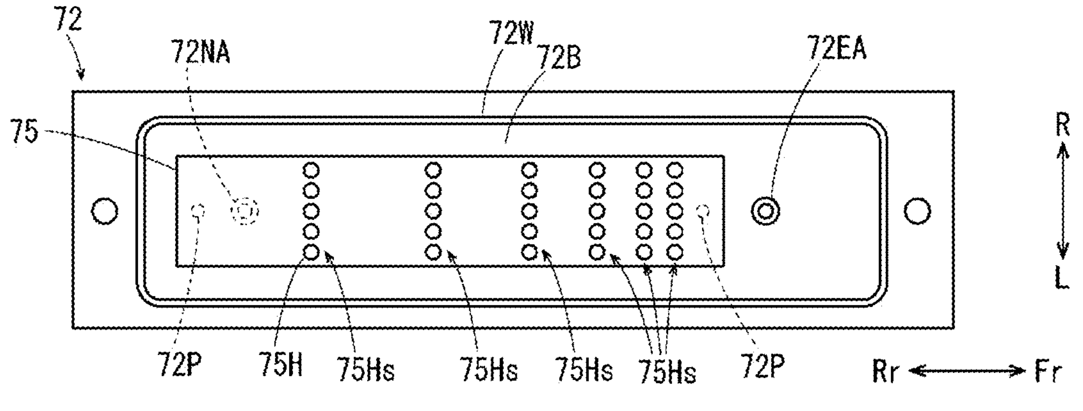
FIG. 19 is a plan view showing a cap including a suppression member according to a third embodiment of the present disclosure.

FIG. 19 is a plan view showing the cap 72 including a suppression member 75 according to a third embodiment. The maintenance device 30 according to the present embodiment includes the cap 72 to be attached to the nozzle surface 14F of the inkjet head 12, the air supply opening 72NA and the exhaust opening 72EA provided in the cap 72, and the suppression member 75 which is provided at least between the air supply opening 72NA and the nozzle surface 14F and has the first gap G1 with respect to the air supply opening 72NA and the second gap G2 with respect to the nozzle surface 14F, the suppression member 75 includes, at positions not opposing the air supply opening 72NA, a plurality of through-holes 75H that penetrate from the air supply opening 72NA side to the nozzle surface 14F side, the plurality of through-holes 75H have equal diameters, and densities of the through-holes 75H become higher as distances thereof from the exhaust opening 72EA become smaller.

Specifically, a through-hole group 75Hs including the plurality of through-holes 75H is provided at a plurality of positions along the direction that is directed from the air supply opening 72NA side toward the exhaust opening 72EA side, and distances among the adjacent through-hole groups 75Hs become smaller as distances thereof from the exhaust opening 72EA become smaller. It is noted that in the example shown in the figure, the number of through-holes 75H included in the through-hole group 75Hs is five, but the number of through-holes 75H included in the through-hole group 75Hs may be any number.

According to the present embodiment, the uniformity of humidification with respect to the nozzle surface 14F can be improved as compared to the case where the densities of the through-holes 75H are uniform. In addition, according to the present embodiment, the uniformity of humidification with respect to the nozzle surface 14F can be improved as compared to a case where the plurality of through-hole groups 75Hs are provided at regular intervals along the direction that is directed from the air supply opening 72NA side toward the exhaust opening 72EA side.

Fourth Embodiment

Figure 20:
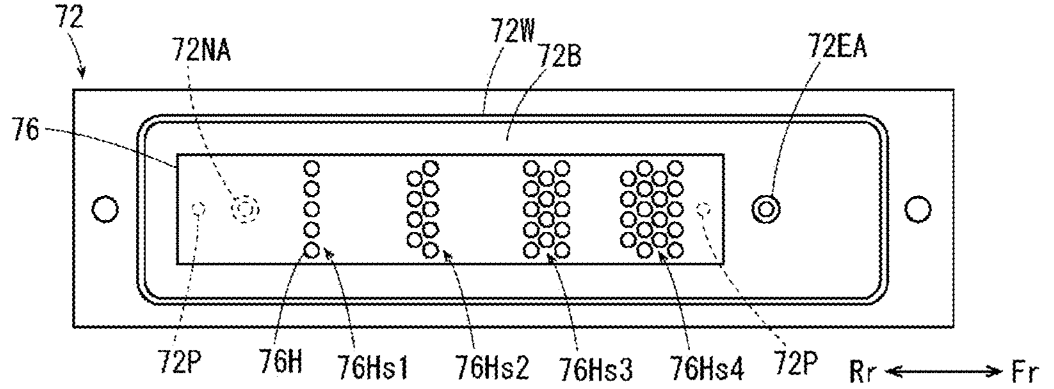
FIG. 20 is a plan view showing a cap including a suppression member according to a fourth embodiment of the present disclosure.

FIG. 20 is a plan view showing the cap 72 including a suppression member 76 according to a fourth embodiment. In the maintenance device 30 according to the present embodiment, through-hole groups 76Hs1 to 4 each including a plurality of through-holes 76H are respectively provided at a plurality of positions along the direction that is directed from the air supply opening 72NA side toward the exhaust opening 72EA side, and the numbers of through-holes 76H of the respective through-hole groups 76Hs1 to 4 increase as distances thereof from the exhaust opening 72EA become smaller.

In the example shown in the figure, the through-hole groups 76Hs1 to 4 respectively include five, nine, 14, and 18 through-holes 76H. In the example shown in the figure, the through-holes 76H are arranged in a staggered pattern when the number of through-holes 76H included in each of the through-hole groups 76Hs1 to 4 exceeds five, but the plurality of through-holes 76H may be arranged in any pattern in each of the through-hole groups 76Hs1 to 4. Also in the example shown in the figure, distances among the adjacent through-hole groups 76Hs1 to 4 become smaller as distances thereof from the exhaust opening 72EA become smaller, but the distances among the adjacent through-hole groups 76Hs1 to 4 may be constant. According to the present embodiment, the uniformity of humidification with respect to the nozzle surface 14F can be improved as compared to a case where the numbers of through-holes 76H respectively included in the plurality of through-hole groups 76Hs1 to 4 are the same.

Fifth Embodiment

Figure 21:
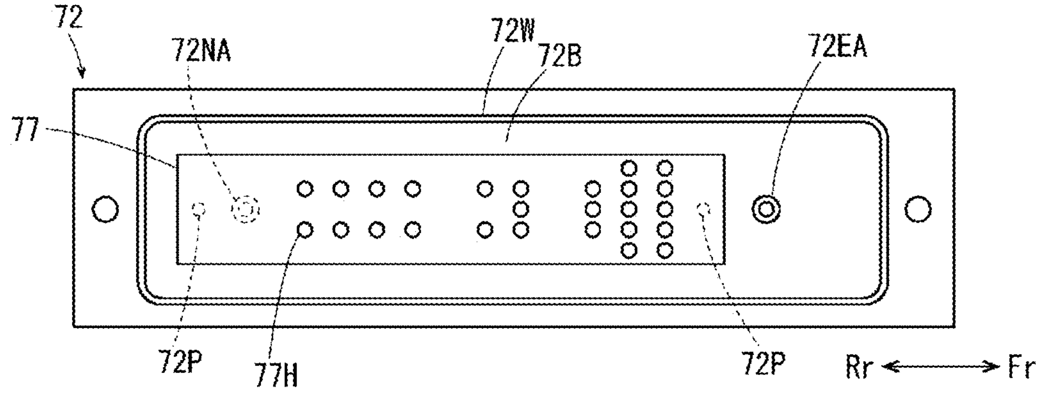
FIG. 21 is a plan view showing a cap including a suppression member according to a fifth embodiment of the present disclosure.

FIG. 21 is a plan view showing the cap 72 including a suppression member 77 according to a fifth embodiment. Although an arrangement of through-holes 77H differs from that of the third and fourth embodiments, in the present embodiment, the plurality of through-holes 77H have equal diameters, and densities of the through-holes 77H become higher as distances thereof from the exhaust opening 72EA become smaller. Also by the present embodiment, the uniformity of humidification with respect to the nozzle surface 14F can be improved as compared to a case where the densities of the through-holes 77H are uniform.

Sixth Embodiment

Figure 22:
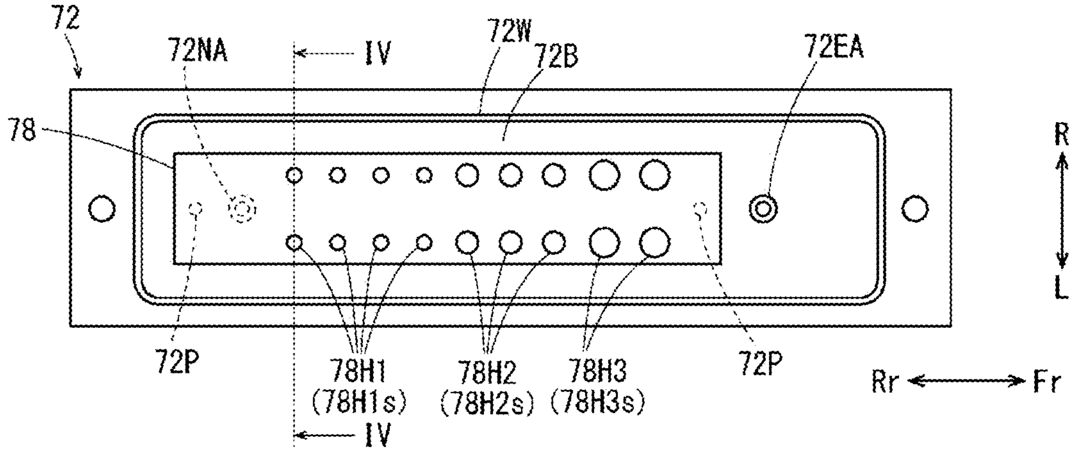
FIG. 22 is a plan view showing a cap including a suppression member according to a sixth embodiment of the present disclosure.

FIG. 22 is a plan view showing the cap 72 including a suppression member 78 according to a sixth embodiment. The maintenance device 30 according to the present embodiment includes the cap 72 to be attached to the nozzle surface 14F of the inkjet head 12, the air supply opening 72NA and the exhaust opening 72EA provided in the cap 72, and the suppression member 78 which is provided at least between the air supply opening 72NA and the nozzle surface 14F and has the first gap G1 with respect to the air supply opening 72NA and the second gap G2 with respect to the nozzle surface 14F, the suppression member 78 includes, at positions not opposing the air supply opening 72NA, a plurality of through-holes 78H1 to 3 that penetrate from the air supply opening 72NA side to the nozzle surface 14F side, and diameters of the through-holes 78H1 to 3 become larger as distances thereof from the exhaust opening 72EA become smaller.

Specifically, through-hole groups 78H1*s*, 78H2*s*, and 78H3*s* respectively including the plurality of through-holes 78H1, 78H2, and 78H3 are respectively provided at a plurality of positions along the direction that is directed from the air supply opening 72NA side toward the exhaust opening 72EA side, and the diameters of the through-holes 78H1, 78H2, and 78H3 of the respective through-hole groups 78H1*s*, 78H2*s*, and 78H3*s* become larger as distances thereof from the exhaust opening 72EA become smaller. According to the present embodiment, the uniformity of humidification with respect to the nozzle surface 14F can be improved as compared to a case where the diameters of the through-holes 78H1, 78H2, and 78H3 of the respective through-hole groups 78H1*s*, 78H2*s*, and 78H3*s* are equal.

Figure 24:
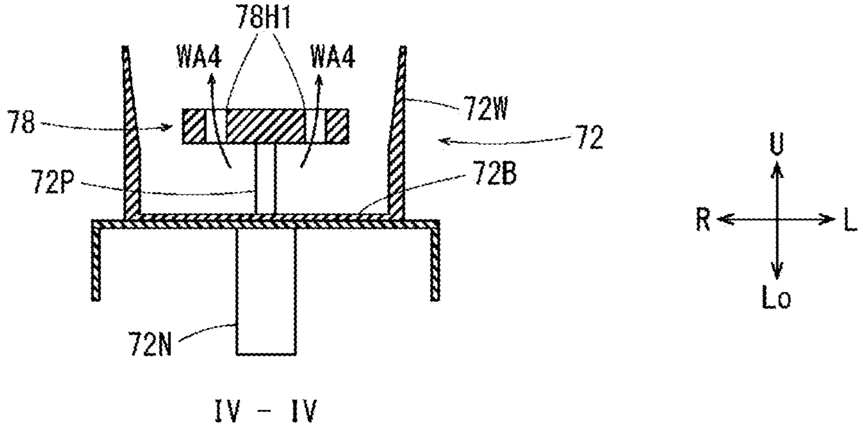
FIG. 24 is a cross-sectional view showing an IV-IV cross section of FIG. 22.

FIG. 24 is a cross-sectional view showing an IV-IV cross section of FIG. 22. The suppression member 78 is provided along the direction that is directed from the air supply opening 72NA side toward the exhaust opening 72EA side, and the plurality of through-holes 78H1 to 3 are provided at both end portion sides of the suppression member 78 in a width direction intersecting with the direction that is directed from the air supply opening 72NA side toward the exhaust opening 72EA side. The plurality of through-holes 78H1 to 3 penetrate from a bottom surface to an upper surface of the suppression member 78. According to the present embodiment, the uniformity of humidification in the width direction with respect to the nozzle surface 14F can be improved as compared to a case where the plurality of through-holes 78H1 to 3 are provided at a center of the width direction.

Figure 25:
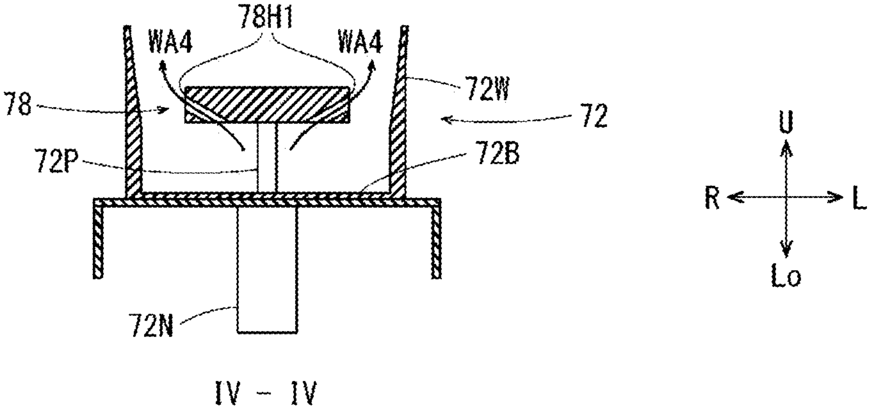
FIG. 25 is a cross-sectional view showing a first modified example of the sixth embodiment of the present disclosure.

FIG. 25 is a cross-sectional view showing a first modified example of the sixth embodiment. The plurality of through-holes 78H1 to 3 penetrate from the bottom surface to side surfaces of the suppression member 78. Also by the present embodiment, the uniformity of humidification in the width direction with respect to the nozzle surface 14F can be improved.

Figure 26:
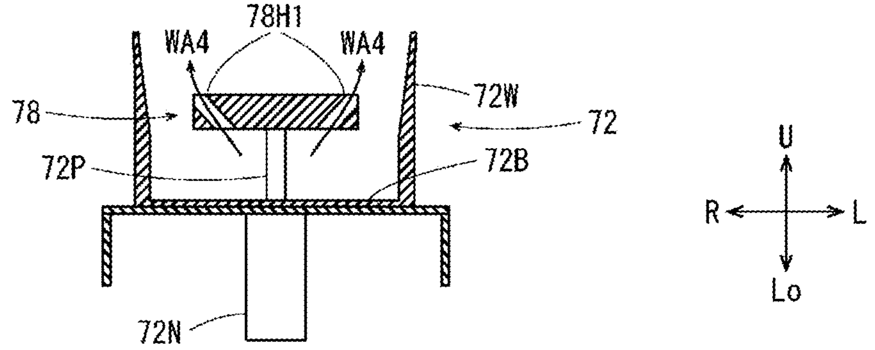
FIG. 26 is a cross-sectional view showing a second modified example of the sixth embodiment of the present disclosure.

FIG. 26 is a cross-sectional view showing a second modified example of the sixth embodiment. The plurality of through-holes 78H1 to 3 penetrate from the bottom surface of the suppression member 78 to ridge line portions where the upper surface and the side surfaces intersect. Also by the present embodiment, the uniformity of humidification in the width direction with respect to the nozzle surface 14F can be improved.

Seventh Embodiment

Figure 23:
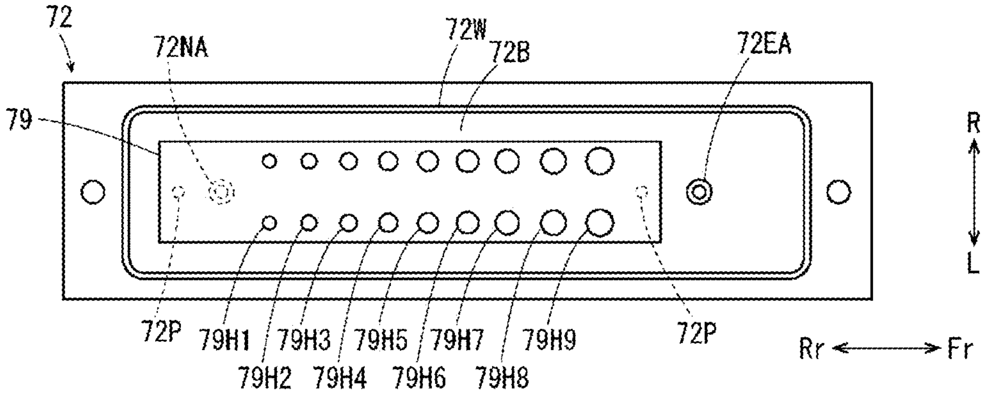
FIG. 23 is a plan view showing a cap including a suppression member according to a seventh embodiment of the present disclosure.

FIG. 23 is a plan view showing the cap 72 including a suppression member 79 according to a seventh embodiment. In the present embodiment, diameters of through-holes 79H1, 79H2, . . . , and 79H9 gradually increase as distances thereof from the exhaust opening 72EA become smaller. Also by the present embodiment, the uniformity of humidification with respect to the nozzle surface 14F can be improved.

Eight Embodiment

Figure 27:
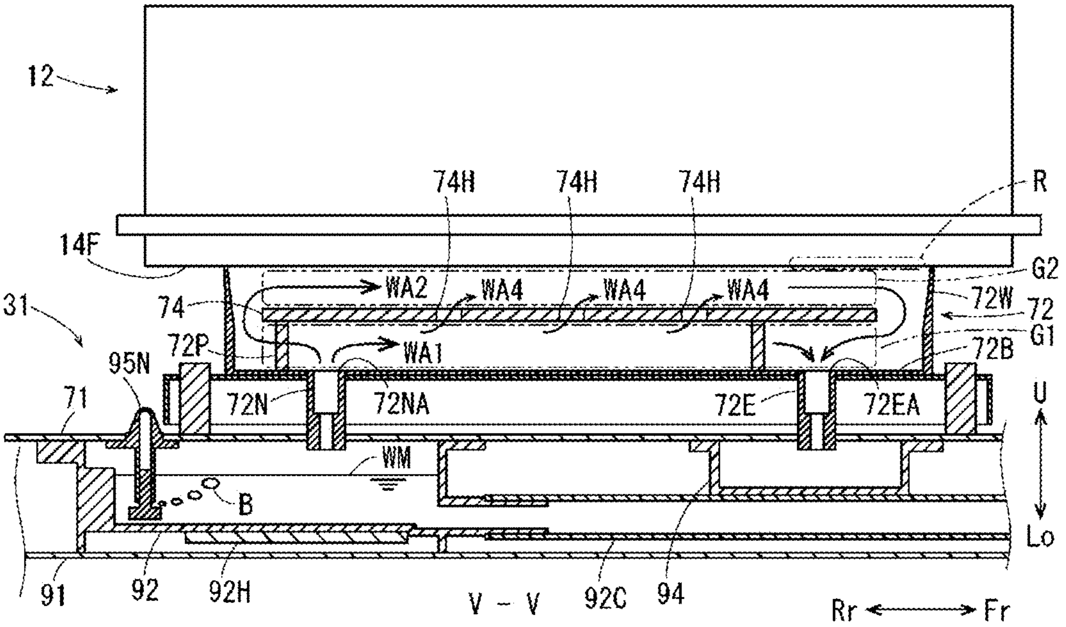
FIG. 27 is a cross-sectional view showing a cap unit including a suppression member according to an eighth embodiment of the present disclosure.
Figure 28:
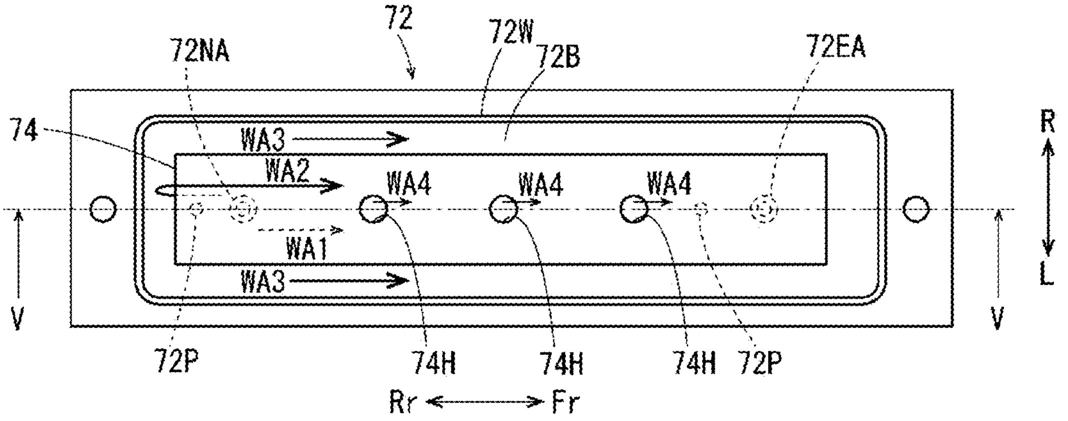
FIG. 28 is a plan view showing a cap including the suppression member according to the eighth embodiment.

FIG. 27 is a cross-sectional view showing the cap unit 31 including the suppression member 74 according to an eighth embodiment. FIG. 28 is a plan view showing the cap 72 including the suppression member 74 according to the eighth embodiment. In the second embodiment (see FIG. 17), the end portion of the suppression member 74 on the exhaust opening 72EA side is positioned more on the rear side than the exhaust opening 72EA, and thus there is a problem that it is difficult for the humidified air WA to be supplied to a region R that is more on the front side than the end portion of the suppression member 74 on the exhaust opening 72EA side in the nozzle surface 14F.

In this regard, in the present embodiment, the end portion of the suppression member 74 on the exhaust opening 72EA side opposes the exhaust opening 72EA. According to the present embodiment, since the humidified air WA that flows through the second gap G2 toward the front side flows into the first gap G1 from the front side of the suppression member 74 to be sucked into the exhaust opening 72EA, the humidified air WA can also be supplied to the nozzle surface 14F on the exhaust opening 72EA side. Thus, according to the present embodiment, the uniformity of humidification with respect to the nozzle surface 14F can be improved.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A maintenance device, comprising:
a cap to be attached to a nozzle surface of an inkjet head;
an air supply opening and an exhaust opening provided in the cap; and
a suppression member which is provided at least between the air supply opening and the nozzle surface and has a first gap with respect to the air supply opening and a second gap with respect to the nozzle surface, wherein
an end portion of the suppression member on a side of the exhaust opening opposes the exhaust opening.

2. The maintenance device according to claim 1, wherein
the suppression member is provided along a direction that is directed from a side of the air supply opening toward the side of the exhaust opening.

3. The maintenance device according to claim 1, wherein
the suppression member includes, at positions not opposing the air supply opening, a plurality of through-holes which penetrate from a side of the air supply opening to a side of the nozzle surface.

4. The maintenance device according to claim 1, wherein
the suppression member is formed of a resin.

5. An inkjet recording apparatus, comprising:
the inkjet head; and
the maintenance device according to claim 1.

* * * * *